(12) United States Patent
Hua et al.

(10) Patent No.: US 7,773,813 B2
(45) Date of Patent: Aug. 10, 2010

(54) CAPTURE-INTENTION DETECTION FOR VIDEO CONTENT ANALYSIS

(75) Inventors: Xian-Sheng Hua, Beijing (CN); Shipeng Li, Redmond, WA (US); Tao Mei, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 11/263,081

(22) Filed: Oct. 31, 2005

(65) Prior Publication Data

US 2007/0101269 A1 May 3, 2007

(51) Int. Cl.
G06K 9/62 (2006.01)
(52) U.S. Cl. .................. 382/224; 382/100; 382/118; 382/155; 348/231.2; 715/723
(58) Field of Classification Search .................. 382/100, 382/155, 156, 224–228; 348/231.2; 715/723
See application file for complete search history.

(56) References Cited

U.S. PATENT DOCUMENTS

| 5,333,091 | A |   | 7/1994  | Iggulden et al. |
|-----------|---|---|---------|-----------------|
| 5,497,430 | A |   | 3/1996  | Sadovnik et al. |
| 5,710,560 | A |   | 1/1998  | Cohn            |
| 5,778,137 | A |   | 7/1998  | Nielsen et al.  |
| 5,821,945 | A | * | 10/1998 | Yeo et al. ............. 345/440 |
| 5,884,056 | A |   | 3/1999  | Steele          |
| 5,901,245 | A |   | 5/1999  | Warnick et al.  |
| 5,952,993 | A |   | 9/1999  | Matsuda et al.  |
| 5,956,026 | A |   | 9/1999  | Ratakonda       |
| 5,966,126 | A |   | 10/1999 | Szabo           |
| 5,983,273 | A |   | 11/1999 | White et al.    |
| 6,020,901 | A |   | 2/2000  | Lavelle et al.  |
| 6,047,085 | A |   | 4/2000  | Sato et al.     |
| 6,100,941 | A |   | 8/2000  | Dimitrova et al.|
| 6,166,735 | A |   | 12/2000 | Dom et al.      |
| 6,168,273 | B1 |  | 1/2001  | Dupraz et al.   |
| 6,182,133 | B1 |  | 1/2001  | Horvitz         |
| 6,232,974 | B1 |  | 5/2001  | Horvitz et al.  |
| 6,236,395 | B1 |  | 5/2001  | Sezan et al.    |

(Continued)

FOREIGN PATENT DOCUMENTS

EP         0597450         5/1994

(Continued)

OTHER PUBLICATIONS

Yu-Fei Ma, Lie Lu, Hong-Jiang Zhang and Mingjing Li, "A User Attention Model for Video Summarization", International Multimedia Conference, Proceedings of the tenth ACM international conference on Multimedia, ACM New York, NY, Dec. 2002, pp. 533-545.*

(Continued)

*Primary Examiner*—Matthew C Bella
*Assistant Examiner*—Eric Rush
(74) *Attorney, Agent, or Firm*—Lee & Hayes, PLLC

(57) ABSTRACT

Systems and methods are described for detecting capture-intention in order to analyze video content. In one implementation, a system decomposes video structure into sub-shots, extracts intention-oriented features from the sub-shots, delineates intention units via the extracted features, and classifies the intention units into intention categories via the extracted features. A video library can be organized via the categorized intention units.

15 Claims, 11 Drawing Sheets

U.S. PATENT DOCUMENTS

| | | | |
|---|---|---|---|
| 6,282,317 B1 | 8/2001 | Luo et al. | |
| 6,292,589 B1 | 9/2001 | Chow et al. | |
| 6,298,145 B1 | 10/2001 | Zhang et al. | |
| 6,307,550 B1 | 10/2001 | Chen et al. | |
| 6,332,163 B1 | 12/2001 | Bowman-Amuah | |
| 6,353,824 B1 | 3/2002 | Boguraev et al. | |
| 6,389,168 B2* | 5/2002 | Altunbasak et al. | 382/224 |
| 6,404,925 B1* | 6/2002 | Foote et al. | 382/224 |
| 6,408,128 B1 | 6/2002 | Abecassis | |
| 6,421,675 B1 | 7/2002 | Ryan et al. | |
| 6,449,251 B1 | 9/2002 | Awadallah et al. | |
| 6,466,702 B1 | 10/2002 | Atkins et al. | |
| 6,473,778 B1 | 10/2002 | Gibbon | |
| 6,516,090 B1* | 2/2003 | Lennon et al. | 382/173 |
| 6,581,096 B1 | 6/2003 | Cottrille et al. | |
| 6,616,700 B1 | 9/2003 | Thum et al. | |
| 6,622,134 B1 | 9/2003 | Sorkin | |
| 6,631,403 B1 | 10/2003 | Deutsch et al. | |
| 6,643,643 B1 | 11/2003 | Lee et al. | |
| 6,643,665 B2 | 11/2003 | Kimbell et al. | |
| 6,658,059 B1 | 12/2003 | Iu et al. | |
| 6,661,468 B2 | 12/2003 | Alten et al. | |
| 6,670,963 B2 | 12/2003 | Osberger | |
| 6,711,587 B1 | 3/2004 | Dufaux | |
| 6,714,909 B1 | 3/2004 | Gibbon et al. | |
| 6,721,454 B1* | 4/2004 | Qian et al. | 382/224 |
| 6,773,778 B2 | 8/2004 | Onozawa et al. | |
| 6,792,144 B1 | 9/2004 | Yan et al. | |
| 6,807,361 B1* | 10/2004 | Girgensohn et al. | 386/52 |
| 6,870,956 B2 | 3/2005 | Qi et al. | |
| 6,934,415 B2 | 8/2005 | Stentiford | |
| 6,956,573 B1* | 10/2005 | Bergen et al. | 345/473 |
| 7,006,091 B2 | 2/2006 | Masera et al. | |
| 7,055,166 B1 | 5/2006 | Logan et al. | |
| 7,062,705 B1 | 6/2006 | Kirkwood et al. | |
| 7,065,707 B2 | 6/2006 | Chen et al. | |
| 7,069,310 B1 | 6/2006 | Bartholomew | |
| 7,072,984 B1 | 7/2006 | Polonsky et al. | |
| 7,095,907 B1 | 8/2006 | Berkner et al. | |
| 7,116,716 B2 | 10/2006 | Ma et al. | |
| 7,248,294 B2 | 7/2007 | Slatter | |
| 7,296,231 B2* | 11/2007 | Loui et al. | 715/723 |
| 7,325,199 B1 | 1/2008 | Reid | |
| 7,356,464 B2 | 4/2008 | Stella et al. | |
| 7,546,544 B1 | 6/2009 | Weber et al. | |
| 7,639,882 B2 | 12/2009 | Itakura | |
| 2001/0023450 A1 | 9/2001 | Chu | |
| 2001/0047355 A1 | 11/2001 | Anwar | |
| 2002/0067376 A1 | 6/2002 | Martin et al. | |
| 2002/0069218 A1 | 6/2002 | Sull et al. | |
| 2002/0073218 A1 | 6/2002 | Aspromonte et al. | |
| 2002/0100052 A1 | 7/2002 | Daniels | |
| 2002/0157116 A1 | 10/2002 | Jasinschi | |
| 2002/0166123 A1 | 11/2002 | Schrader et al. | |
| 2003/0033347 A1 | 2/2003 | Bolle et al. | |
| 2003/0115607 A1 | 6/2003 | Morioka et al. | |
| 2003/0123850 A1 | 7/2003 | Jun et al. | |
| 2003/0152363 A1 | 8/2003 | Jeannin et al. | |
| 2003/0210886 A1 | 11/2003 | Li et al. | |
| 2003/0237053 A1 | 12/2003 | Chen et al. | |
| 2004/0001106 A1 | 1/2004 | Deutscher et al. | |
| 2004/0040041 A1 | 2/2004 | Crawford | |
| 2004/0068481 A1 | 4/2004 | Seshadri et al. | |
| 2004/0071083 A1 | 4/2004 | Li et al. | |
| 2004/0078357 A1 | 4/2004 | LaChapelle et al. | |
| 2004/0078382 A1 | 4/2004 | Mercer et al. | |
| 2004/0078383 A1 | 4/2004 | Mercer et al. | |
| 2004/0085341 A1 | 5/2004 | Hua et al. | |
| 2004/0088726 A1 | 5/2004 | Ma et al. | |
| 2004/0125877 A1* | 7/2004 | Chang et al. | 375/240.28 |
| 2004/0128317 A1 | 7/2004 | Sull et al. | |
| 2004/0165784 A1 | 8/2004 | Xie et al. | |
| 2004/0184776 A1 | 9/2004 | Inoue et al. | |
| 2004/0236863 A1 | 11/2004 | Shen et al. | |
| 2004/0267952 A1 | 12/2004 | He et al. | |
| 2005/0084232 A1 | 4/2005 | Herberger et al. | |
| 2005/0114784 A1 | 5/2005 | Spring et al. | |
| 2005/0169312 A1 | 8/2005 | Cakareski et al. | |
| 2005/0175001 A1 | 8/2005 | Becker Hof et al. | |
| 2005/0207442 A1 | 9/2005 | Zoest et al. | |
| 2005/0257151 A1 | 11/2005 | Wu | |
| 2005/0262439 A1 | 11/2005 | Cameron | |
| 2006/0026528 A1 | 2/2006 | Paulsen et al. | |
| 2006/0107209 A1 | 5/2006 | Chen et al. | |
| 2006/0123053 A1 | 6/2006 | Scannell, Jr. | |
| 2006/0190435 A1 | 8/2006 | Heidloff et al. | |
| 2006/0190615 A1 | 8/2006 | Panwar et al. | |
| 2006/0200442 A1 | 9/2006 | Parikh | |
| 2006/0239644 A1 | 10/2006 | Barbieri | |
| 2007/0027754 A1 | 2/2007 | Collins et al. | |
| 2007/0060099 A1 | 3/2007 | Ramer et al. | |
| 2008/0065751 A1 | 3/2008 | Hampson | |

FOREIGN PATENT DOCUMENTS

| | | |
|---|---|---|
| EP | 1168840 | 1/2002 |
| EP | 1213915 | 6/2002 |
| GB | 2356080 | 5/2001 |
| JP | 2001184802 A | 7/2001 |
| JP | 2002125199 A | 4/2002 |
| JP | 2002238027 | 8/2002 |
| KR | 20020009089 A | 2/2002 |
| KR | 20040042449 A | 5/2004 |
| WO | WO0028467 A1 | 5/2000 |

OTHER PUBLICATIONS

Adams, at al., "Seeded Region Growing", IEEE, Vol. 16, No. 6, 1994, pp. 641-648.

Alexander, et al., "Informedia: News-on-Demand Multimedia Information Acquisition and Retrieval", 1997, pp. 1-21.

DeMenthon, et al., "Video Summarization by Curve Simplification", ACM, 1998, pp. 211-218.

Gong, et al., "Creating Motion Video Summaries with Partial Audio-Visual Alignment", IEEE, 2002, pp. 285-288.

U.S. Appl. No. 10/179,161, filed Jun. 24, 2002 inventors Jin-Lin Chen & Wei-Ying Ma entitled "Function-based Object MOdel for Web Page Display in a Mobile Device".

U.S. Appl. No. 10/285,933, filed Nov. 1, 2002 inventors Yu-Fei Ma et al. entitled "Systems and Methods for Generating a Motion Attention Mode".

U.S. Appl. No. 10/286,053, filed Nov. 1, 2002 inventors Yu-Fei Ma et al. entitled "Systems and Methods for Generating a Comprehensive User Attention Model".

U.S. Appl. No. 10/286,348, filed Nov. 1, 2002 inventors Xian-Sheng Hua et al. entitled "Systems and Methods for Automatically Editing a Video".

U.S. Appl. No. 10/371,125, filed Feb. 20, 2003 Inventors Wei-Ying Ma et al. Entitled "Systems and Methods for Enhanced Image Adaptation".

"Advanced Digital Video Storage and On-line Retrieval System", Advisor Project, Jun. 30, 2002, retrieved from the Internet; http://advisor.matrasi-tls.fr/DUP_workshop_sheet.pdf.

Ahmad, "VISIT: A Neural Model of Covert Visual Attention" Advances in Neural Information Processing Systems v. 4 1991 pp. 420-427.

Baluja et al., "Expectation-Based Selective Attention for Visual Monitoring and Control of a Robot Vehicle" Robotics and Autonomous System v. 22 No. 3-4 Dec. 1997 pp. 329-344.

Bertini et al., "Indexing for Resue of TV News Shots" Pattern Recognition, Elsevier, Kidlington, GB, vol. 35, No. 3, Mar. 2002, pp. 581-591.

Chen et al., "A Visual Attention Model for Adapting Images on Small Displays" ACM Multimedia Systems Journal 2003.

Chen et al., "Function-based Object Model Towards Website Adaptation" (2001) Proc. of the 10th Int. wWW Conf. pp. 1-21.
Cherry, "Pesky Home Networks Trouble cable Behemoths" IEEE Spectrum Apr. 2002 pp. 60-61.
Christopoulos et al., "The JPEG2000 Still Image Coding System: An Overview" IEEE Transactions on Consumer Electronics vol. 46 No. 4 pp. 1103-1127 Nov. 2000.
Deng et al., "Peer Group Filtering and Perceptual Color Image Quantization" Proceedings of IEEE International Symposium on Circuits and systems vol. 4 1999 pp. 21-24.
Divakaran et al., "Video Summarization Using Descriptors of Motion Activity: A Motion Activity based approach to Key-Frame Extraction from Video Shots" Journal of Electronic Imaging Oct. 2001 vol. 10 No. 4 pp. 909-916.
Gamaz et al., "Robust scene-change detection in MPEG compressed domain" Elec & Comp. Eng. pp. 95-99 1998.
Gu et al., "Dissolve detection in MPEG compressed video" IEEE pp. 1692-1696 1997.
Hargrove et al., "Logo Detection in Digital Video" Math 100 Mar. 6, 2001 http://toonarchive.com/logo-detection/ 9 pages.
Held, "Focus on Agere System's Orinoco PC Card" International Journal of Network Management Jan. 2002 pp. 187-193.
Heng et al., "Post shot boundary detection technique: Flashlight scene determination" University of Western Australia pp. 447-450 1999.
http://www.fatalfx.com/nomad/ "NOMAD (No More Advertising)" Feb. 17 2003 4 pages.
Itti et al., A Comparison of Feature Combination Strategies for Saliceny-Based Visual Attention Systesm: Proc. of SPIE Human Vision and Electronic Imaging IV (HVEI'99) San Jose CA vol. 3644 pp. 473-82 Jan 1999.
Itti et al., "A Model of Saliency-based Visual Attention for Rapid Scene Analysis" IEEE Trans. on Pattern Analysis and Machine Intelligence 1998 5 pages.
Itti et al., "Computational Modelling of Visual Attention" Nature Reviews/Neuroscience vol. 2 Mar. 2001 pp. 1-11.
Jha, et al., "Wireless Landscape-Need for Seamless Connectivity" Wireless Personal Communications 2002 pp. 275-283.
Jing et al., "An Effective Region-Based Image Retrieval Framework" From ACM Multimedia 2002 28 pages.
Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.
Lee et al., "Perception-Based Image Transcoding for Universal Multimedia Access" School of Electrical Engineering Korea University Seoul Korea 2001 IEEE pp. 475-478.
Lelescu et al., "Real-time scene change detection on compressed multimedia bitstream based on statistical sequential analysis" IEEE pp. 1141-1144 2000.
Li et al., "Statistical Learning of Multi-View Face Detection" Proceedings of ECCV 2002 25 pages.
Lienhart, et al., "On the Detection and Recognition of Television Commercials" University of Mannheim 17 pages.
Lin et al., "Video Schene Extraction by Force Competition" IEEE Intl. Conference on Multimedia and Expo (ICME 001) Waseda University Tokyo Japan Aug. 22-25, 2001 4 pages.
Lu et al., "A Robust Audio Classification and Segmentation Method" Microsoft Research China 9 pages.
Lu et al., "Content Analysis for Audio Classification and Segmentation" IEEE Transactions on Speech and Audion Processing vol. 10 No. 7 Oct. 2002 pp. 504-516.
Lu et al., "Content-Based Audio Segmentation Using Support Vector Machines" 2001 IEEE pp. 956-959.
Ma et al., "A Model of Motion Attention for Video Skimming" Microsoft Research Asia 4 pages.
Ma et al., "A New Perceived Motion Based Shot Content Representation" Microsoft Research China 4 pages.
Ma et al., "A User Attention Model for Video Summarization" Proceedings of ICIP 2002.
Milanese et al., "Attentive Mechanisms for Dynamic end Static Scene Analysis" Optical Engineering v34 No. 8 Aug. 1995 pp. 2428-2434.
Niebur et al. "Computational Architectures for Attention" The Attentive Brain Chapter 9 1998 pp. 163-186.
O'Toole, "An MPEG-1 shot boundary detector using XIL colour histograms" Dublin City University pp. 1-7 1998.
O'Toole et al., "Evaluation of Automatic Shot Boundary Detection on a Large Video Test Suite" School of Computer Applications & School of Electronic Engineering Dublin City University Glasnevin Dublin Ireland Challenge of Image Retrieval Newcastle 1999 pp. 1-12.
Sadlier, "Automatic TV Advertisement Detection from MPEG Bitstream" Centre for Ditial Video Processing/Research Institute for Network & Communication Eng. Dublin City University 12 pages.
Sahoo et al., "Threshold Selection Using a Minimal Histogram Entropy Difference" Optical Engineering v36 No. 7 Jul. 1997 pp. 1976-1981.
Sanchez et al., "AudiCom: A Video Analysis System for Auditing Commercial Broadcasts" Computer Vision Center Departament d'Inforrnatica Universitat Autonoma de Barcelona 5 pages.
Smith et al., "Video Skimming and Characterization through the Combination of Image and Language Understanding Techniques" Proc. of Computer Vision and Pattern Recognition 1997 IEEE pp. 775-781.
Smith, et al. "Video Skimming and Characterization through the Combination of Image and Language Understanding Techniques," Proc. of Computer Vision and Pattern Recognition, 1997 IEEE, pp. 775-781.
Tsotsos et al., "Modeling Visual Attention Via Selective Tuning" Artificial Intelligence v78 1995 pp. 507-545.
Wolfe et al., "Deplying Visual Attention: The Guided Search Model" AI and the Eye Chapter 4 1990 pp. 79-103.
Yeo et al., "Rapid scene analysis on compressed video" IEEE pp. 533544 1995.
Yusoff, et al., "Video shot cut detection using adaptive thresholding" University of Surrey pp. 1-10 2000.
Zhang et al., "A Hierarchical Organization Scheme for Video Data" Pattern Recognition, Elsevier, Kidlington, GB, vol. 35 No. 11, Nov. 2002, pp. 2381-2387.
Goncalves, "Towards a Learning Model for Feature Integration in Attention Control", retrieved on Jul. 19, 2006 at <<http://ieeexplore.ieee.org/search/srchabstract.jsp?arnumber=1013553&isnumber=21824&pun>>, International Conference on Multisensor Fusion and Integration for Intelligent Systems, Aug. 20-22, 2001, pp. 311-316.
Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.
Beg, "User Feedback Based Enchancement in Web Search Quality", Elsevier Science Inc., Feb. 2005, vol. 170, p. 20.
Bennett, et al., "Proscenium: A Framework for Spatio-Temporal Video Editing", Nov. 2-3, 2003, ACM, 2003, Berkeley, p. 8.
Degn, et al., "Peer Group Filtering and Perceptual Color Image Quantization", vol. 4, IEEE, Jul. 1999, p. 4.
Fan, et al., "Visual Attention Based Image Browsing On Mobile Devices", IEEE Computer Society 2003, vol. 2, p. 4.
Foote, et al., "Creating Music Videos using Automatic Media Analysis", ACM 2002, p. 8.
Girgensogn, et al., "Home Video Editing Made Easy—Balancing Automation and User Control", 2001, p. 8.
Graham, et al., "The Video Paper Multimedia Playback System", ACM, Nov. 2-8, 2003, p. 2.
Hua, et al., "Automatically Converting Photographic Series into Video", Oct. 10-16, 2004, ACM, 2004, p. 8.
Hua, et al., "AVE—Automated Home Video Editing", Nov. 2-8, 2003, ACM, p. 8.
Hua, et al., "Video Booklet", Jul. 6-8, 2005, IEEE, 2005, p. 4.
Kelly, et al., "Implicit Feedback for Inferring User Preference: A Bibliography", SIGIR Forum, vol. 32, No. 2, 2003, pp. 18-28.
"NOMAD (No More Advertising)", retrieved on Jun. 28, 2004, at <<http://www..fatalfx.com/nomad/<<, pp. 1-4.
Pirolli, "Exploring Browser Design Trade-offs Using a Dynamical Model of Optimal Information Foraging", Apr. 18-23, 1998, CHI, 1988, pp. 33-40.

Smith, et al., "Scalable Multimedia Delivery for Pervasive Computing", ACM, 1999, pp. 131-140.

Sugiyama, et al., "Adaptive Web Search Based on Users Implicit Preference", ACM, 2004, p. 8.

Yip, et al., "The Automatic Video Editor", Nov. 2-8, 2003, ACM, p. 2.

PCT Search Report patent application No. 2006-042504 mailed on Mar. 26, 2007, p. 9.

PCT Search Report patent application No. 2006-049090 mailed Jul. 13, 2007, p. 7.

Dufaux, "Key frame selection to represent a video", Proc. 2000 Int. Con. on Image Processing, vol. 2, Sep. 2000, pp. 275-278.

Rauschenbach, et al., "Demand-driven image transmission with levels of detail and regions of interest", Computers & Graphics, 1999, pp. 857-866.

Rauschenbach, et al., "Flexible Embedded Image Communication using Levels of Detail and Regions of Interest", Proc. IMC'98, 1998, pp. 1-10.

Girgensogn, et al., "A Semi-automatic Approach to Home Video Editing", UIST 2000, San Diego, CA, 9 pages.

Li, "PeerStreaming: A Practical Receiver-Driven Peer-to-Peer Media Streaming System", Microsoft, Sep. 2004.

Vetro, et al., "Object-Based Transcoding for Adaptable Video Content Delivery", Transactions on Circuits and Systems for Video Technology, IEEE, vol. 11, No. 3, Mar. 2001, pp. 387-401.

Wolf, "Key Frame Selection by Motion Analysis", Conf. Proceedings Acoustics, Speech, and Signal Processing, 1996 IEEE International Conference, May 1996, vol. 2, pp. 1228-1231.

Zhuang et al., "Adaptive Key Frame Extraction Using Unsupervised Clustering", Oct. 1998 In IEEE International Conference on Image Processing, vol. 1, pp. 866-870.

Ex parte Douglas K. Brubacher and Luciano Passuello, Board Patent Appeals and Interference, Jan. 22, 2009.

Padmanabhan et al., "Resilient Peer to Peer Streaming", <<http://eprints.kfupm.edu.sa/62381.pdf>>, Mar. 2003.

Uchihashi et al., "Video Manga: Generating Semantically Meaningful Video Summaries", In Proceedings of the Seventh ACM International Conference on Multimedia, Orland Florida, Oct. 30-Nov. 5, 1999, ACM, pp. 383-392.

* cited by examiner

CAPTURE-INTENTION DETECTION FOR VIDEO CONTENT ANALYSIS

BACKGROUND

As camcorders become widely used to capture memorable experiences and document daily lives, the quantity of home video data increases dramatically. But most video recordings are reserved in storage and seldom viewed due to the relatively low content quality of raw homemade videos, despite the personalized subject matter. It is difficult to turn the raw video data into a useful, well-organized, and easy-to-access collection or database. After a long period of time, camcorder users may even forget why they captured the video clips in the first place.

Conventional systems for home video content analysis and organization are designed from the perspective of a viewer. Generally, there are three widely accepted approaches for such applications: video structuring, highlight detection, and authoring.

Video structuring discovers home video structure and provides users with a compact summary of the content. For example, structure can be derived by clustering stamped date information, and the importance of a structure unit can be derived from a sound feature.

In contrast, highlight detection aims at mining specific patterns in home videos for dynamic summarization. For example, the visual significance of a zoom-and-hold camera operation can be used to find interesting segments. Both static and moving patterns can be detected in an elementary structure unit called a "snippet" for pattern indexing in home videos. Since automatic highlight identification is still a challenging issue, a user interface enables only a semi-automatic ability to find highlights.

Recently, many systems have offered home video authoring, and focus on creating a new video clip from many old ones, with additional effects added. Suitable clips can be assigned numerical suitability scores, organized by the users into a storyboard, and then concatenated automatically as the final video. The created video can be regarded as a dynamic summary based on the user's interest level. Another system provides dynamic highlights of home video content by selecting desirable high quality clips and linking them with transition effects and incidental music. The linking can even correct lighting and remove shaking by stabilizing the clips.

It is evident that existing algorithms and conventional systems for home video content analysis are all designed from the viewer's perspective. But the viewer's perspective is not as effective for classifying video content as the mental state of the original camcorder operator would be. Moreover, the development of psychology and computer vision techniques, especially studies of the visual attention model, have alleviated the semantic gap between low-level visual stimuli and high-level intention concept. This has made it practical to estimate the capture intention.

SUMMARY

Systems and methods are described for detecting capture-intention in order to analyze video content. In one implementation, a system decomposes video structure into sub-shots, extracts intention-oriented features from the sub-shots, delineates intention units via the extracted features, and classifies the intention units into intention categories via the extracted features. A video library can be organized via the categorized intention units.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

With the rapid adoption of digital video recorders for consumers and the increase of homemade video recordings, video content analysis has become an interesting and key research area that tries to provide personalized experiences and custom services for both camcorder users and home viewers.

Systems and methods described herein provide video content analysis based on the intention of the person ("camcorder user" or "user") who created the video content, i.e., the person who filmed the video content for some reason. This intentionality of the camcorder user operating the video camera is referred to herein as "capture-intention" (or just "intention"). Capture-intention is closely related to the mental state(s) of the camcorder user. Thus, in video content analysis, capture-intention is distinguishable from viewer perception and viewer intention. A collection of video content arranged with the viewer in mind may be organized very differently from a collection arranged according to capture-intention—by an exemplary system described herein.

The systems and methods described herein apply principles (that describe the human "intention mechanism") from psychology and neuropsychology to video content analysis and organization. An exemplary system estimates capture-intention from features extracted from the video content. That is, the video recordings are processed to estimate the camcorder user's capture-intention without the camcorder user having to be present or even available in the future. Once classified according to capture-intention, the video content, e.g., a video library of difficult-to-use and difficult-to-find recordings, can then be organized, catalogued, and indexed, etc., according to capture-intention in order to render the collection very accessible and user-friendly.

An exemplary system defines a set of domain-specific capture-intention concepts. A comprehensive and extensible schema consisting of video structure decomposition, intention-oriented feature analysis, intention unit segmentation, and intention classification tracks the users' capture-intention.

Capture-Intention Modeling

"Intention," which is also called "motivation," "purpose," or even "will," is a psychological conception. "Intention" is commonly defined as a determination to act in a certain way; a concept considered as the product of attention directed to an object or knowledge. Psychologists often use the notion of "intention" to characterize both people's states of mind, and their actions—as done intentionally, or with a certain intention.

Exemplary System

Figure 1:
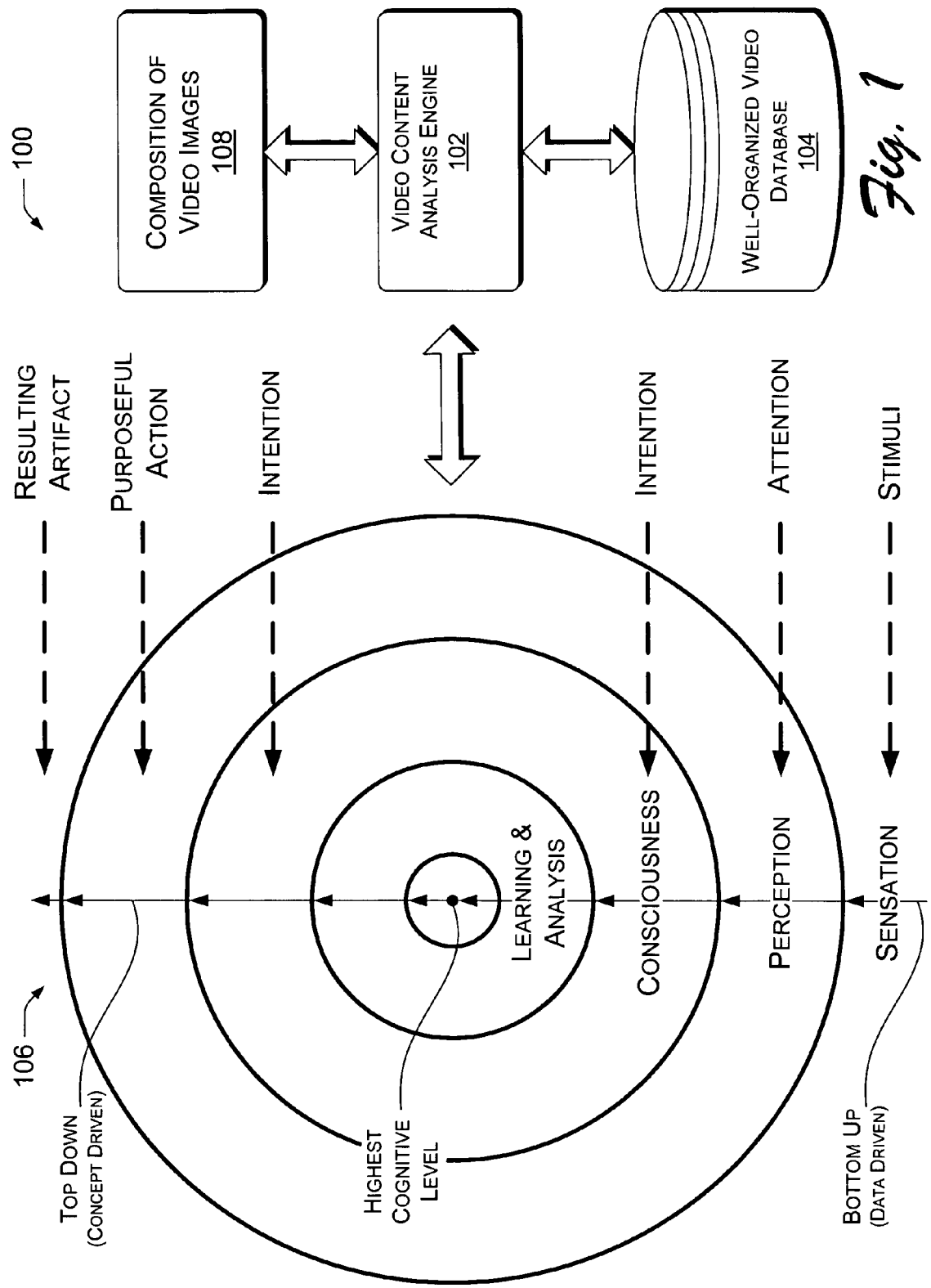
FIG. 1 is a diagram of an exemplary system for intention-based video content analysis.

FIG. 1 shows an exemplary system 100, in which a video content analysis engine 102 creates a well-organized video database 104 that is based on a psychological intentionality schema 106. The psychological intentionality schema 106 describes the capture-intention of the person acquiring images with a camera to create video images 108 having a given composition. The intentionality schema 106 applies to human intention mechanisms in general, and accordingly, to camcorder users in particular. In the illustrated intentionality schema 106, the control of information processing is thought to include two interactive and parallel processes: a "bottom-up" data-driven path that proceeds from the empirical data of the "real world" to the highest cognitive centers of the human mind, and a "top-down" concept-driven path that proceeds from the thought and will of the human mind to intentional actions resulting in created artifacts or other changes to the material world.

In this intentionality schema 106, sensation is at the bottom level, representing the stimuli outside the human body such as vision, sound, etc. On a higher level, perception is the organization and interpretation of the sensed stimuli. Attention, a part of perception, implies selectivity and the mind's process of gathering information from the surrounding social and physical environment, however this may happen without conscious control per se. Consciousness is at a higher cognitive level than perception, representing a state of self-awareness or active cognition. "Intention" is often held to correspond to this consciousness level. Learning and analysis, sometimes considered essential distinctions between humans and other animals, is at the highest level of information processing in the illustrated intentionality schema 106. Therefore, external stimuli, attention, and intention represent three schematic levels in psychology from lower to higher cognitive levels: sensation, perception and consciousness.

Figure 2:
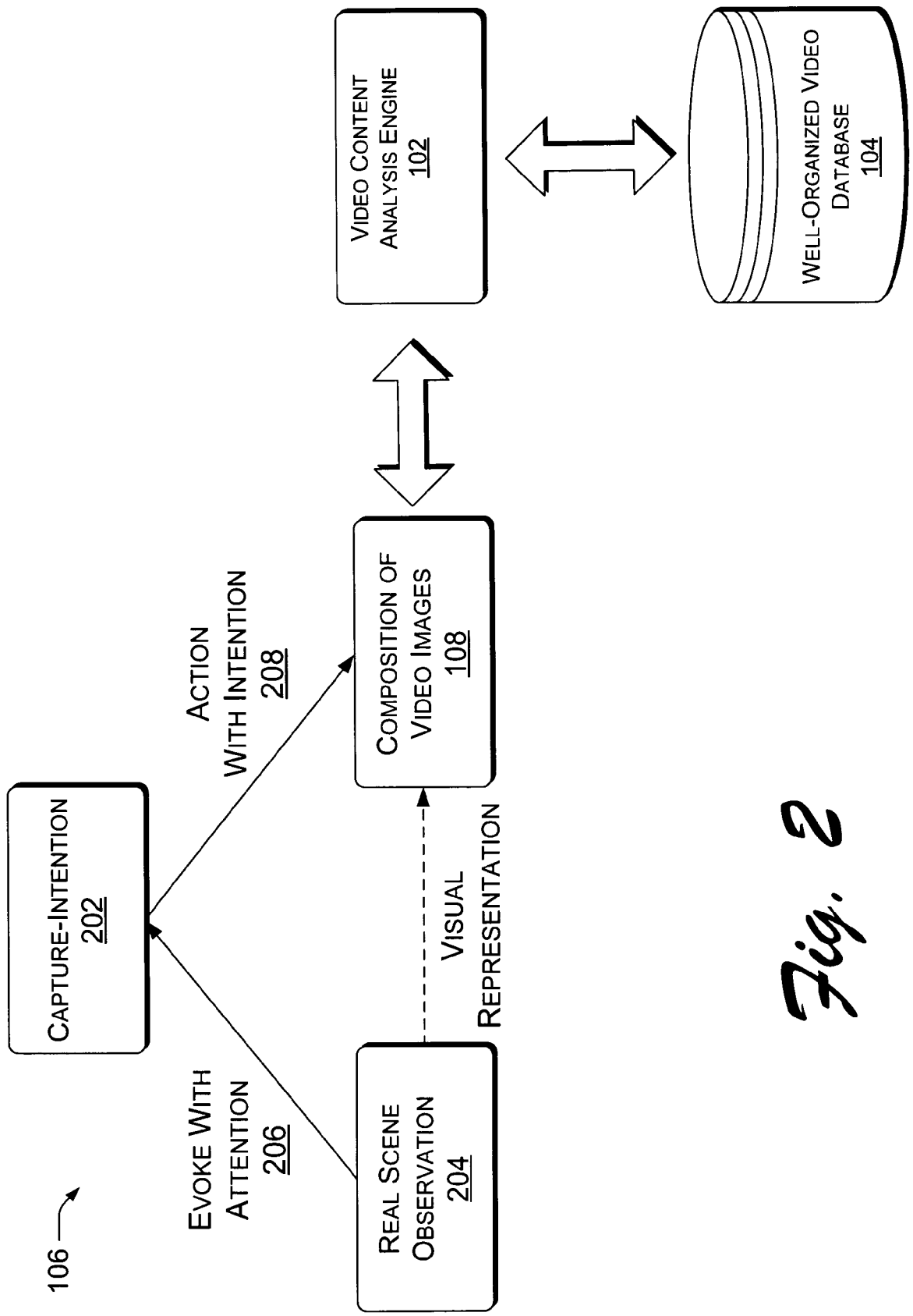
FIG. 2 is another diagram of an exemplary system for intention-based video content analysis.

FIG. 2 shows a "side view" of the intentionality schema 106, in which the general psychological principles of FIG. 1 are made specific to the scenario of a camcorder user creating homemade video recordings. Accordingly, capture-intention 202 as it applies to a camcorder user, is a specific kind of intention, that is, a specific kind of psychological behavior. This behavior of forming an intention to film a certain object or film in a certain manner, is evoked by observing a real scene 204 with attention 206 (especially attention as drawn to objects or regions perceived as attractive). The capture-intention 202 inducts the user's action 208 toward filming and operating the video camera, and finally affects the composition of video images 108 by integrating a set of informative visual elements ("features").

The principles of capture-intention 202 can be summarized as follows. Attention 206 is at the nexus between external stimuli 204 and intention 202, and this also indicates that attention 206 is a key factor in generating intention 202. So, to track capture-intention 202, the video content analysis engine 102 can detect the user's attention 206 as a mid-level feature of intention-based video content analysis. As stimuli 204 are at lower level than intention 202, according to the information process, the stimuli also affect the generation of intention 202. That is, intention 202 is not only correlative with attention 206, but also with content 204 (i.e., the visual content being filmed or selected for filming). Full understanding of the relationship of attention 206 to the raw stimuli 204 available to become video content 108 remains, of course, a challenging issue in computer vision. A set of generic visual features ("content generic features") representing the effect of content (i.e., the raw stimuli) on capture-intention 202 is also desirable for performing video content analysis based on human intention.

In one implementation, the video content analysis engine 102 classifies the capture-intention 202 of camcorder users into seven categories. Other appropriate categories can also be defined based on further study of users' capture-intention 202. The seven intention categories are listed in Table (1):

TABLE 1

| Category | Capture-intention definition Definition |
|---|---|
| Static Scene (SS) | To capture a static object or scene with few object motion, e.g. furnishings, high buildings, strange signboards, and so on. |
| Dynamic Event (DE) | To track a dynamic event where something is happening with obvious object motions, e.g. running, surfing, street show, swimming, and so on. |
| Close-up View (CV) | To capture the close-up view of some body, i.e. the detailed expression of human face. |
| Beautiful Scenery (BS) | To record beautiful scenery, e.g. seascape, mountains, overlook of cityscape, and so on. |
| Switch Record (SR) | To switch from one intention or capture action to another with relatively fast camera motion, e.g. switch between two persons in their conversation, pan fast to capture an unexpected event when capturing a normal scene. |
| Longtime Record (LR) | To record an entire or relatively large portion of an evening, party, ceremony, lecture and free talk (for a relatively long time). |
| Just Record (JR) | The complement set of the above six categories, i.e., capturing without a specific or obvious intention, e.g. recording roadside scenes on a moving vehicle, recording because of forgetting to turn off the camera. |

Figure 3:
FIG. 3 is a diagram of exemplary intention categories.

FIG. 3 shows sample key-frame images of each of the intention categories 300 listed in Table 1. How the exemplary video content analysis engine 102 associates a particular category of intention with features of a video recording will now be described.

Generally, video recordings can be decomposed into 3-layer temporal segments, from large to small, including "scene," "shot," and "sub-shot." Shot is a basic physical structure of video resulting from the camcorder user's start and stop operations. Scene is a group of consecutive and similar shots, which may be taken in the same place or same period of time. Sub-shot is a sub-segment within a shot, or in other words, each shot can be divided into one or more consecutive sub-shots. In one implementation, sub-shot segmentation is equivalent to camera motion detection, which means one sub-shot corresponds to one unique camera motion. For example, suppose that during a shot the camera pans from left to right, then zooms-in to a specific object, then pans to the top, then zooms-out, and then stops. This shot then consists of four sub-shots including one pan to the right, one zoom-in, one pan to the top, and one zoom-out.

"Intention unit" is another layer of temporal segmentation that is also applied by the exemplary video content analysis engine 102. An intention unit is defined herein as a video segment that cannot be divided further into two or more temporal segments with different intention types. In one experiment that analyzed approximately 92 hours of homemade videos, around 70% of the shots each contained only one intention unit, while the remaining 30% of the shots each contained more than one intention units. For example, one shot in the remaining 30% contained more than one sub-shot. This implies that a "shot," as defined above, does not necessarily or even usually correspond to a single intention unit.

On the other hand, even though a "scene" is a set of shots unified as to time and place, a scene usually has more than one intention. A sub-shot, which is defined by a homogeneous camera motion, is often too short to deliver an intention, as defined herein. Consequently, the existing three temporal layers are not suitable for being identified with the basic intention unit in a one-to-one manner. In one implementation, the exemplary video content analysis engine 102 analyzes capture-intention 202 at the nexus between shot and sub-shot. That is, intention is smaller than "shot" but larger than "sub-shot." Thus, in one implementation, video content is represented as the following hierarchical 4-layer temporal structure from larger unit to smaller unit: scene; shot; intention unit; and sub-shot. The segmentation of video according to intention units will be described in more detail further below.

It is worth noting that capture-intention 202 for camcorder users can vary somewhat from "attention" and "intention" as applied to film directors. In a commercially produced film, attention and intention are often deliberately modeled to produce a recording that is conscious of the viewer's viewpoint (the eventual viewing audience). Capture-intention 202, however, has as its domain homemade video, modeled from a narrative point of view. In a commercial attention model, video features for content analysis are extracted at the frame level in order to assign an attention value to each frame; while in the exemplary capture-intention 202 model described herein, the sub-shot is selected as the elementary "atomic" structure unit for feature analysis. Thus, compared with the typical "scripted" intention of commercial film directors, the capture-intention 202 of camcorder users is usually more passive than active. Therefore, capture-intention 202 is easier to model in home videos, since home videos are usually created to record personal experiences, often based on personal attractions. In the filmmaking arts, by contrast, directors usually express or embed their intentions more actively and formally into the film according to the "meaning" of the film by formally configuring the scenes (the so-called "mise-en-scene"). Thus, it is much more difficult to model film directors' intention due to its diversity, complexity, and scriptedness.

Exemplary Engine

Figure 4:
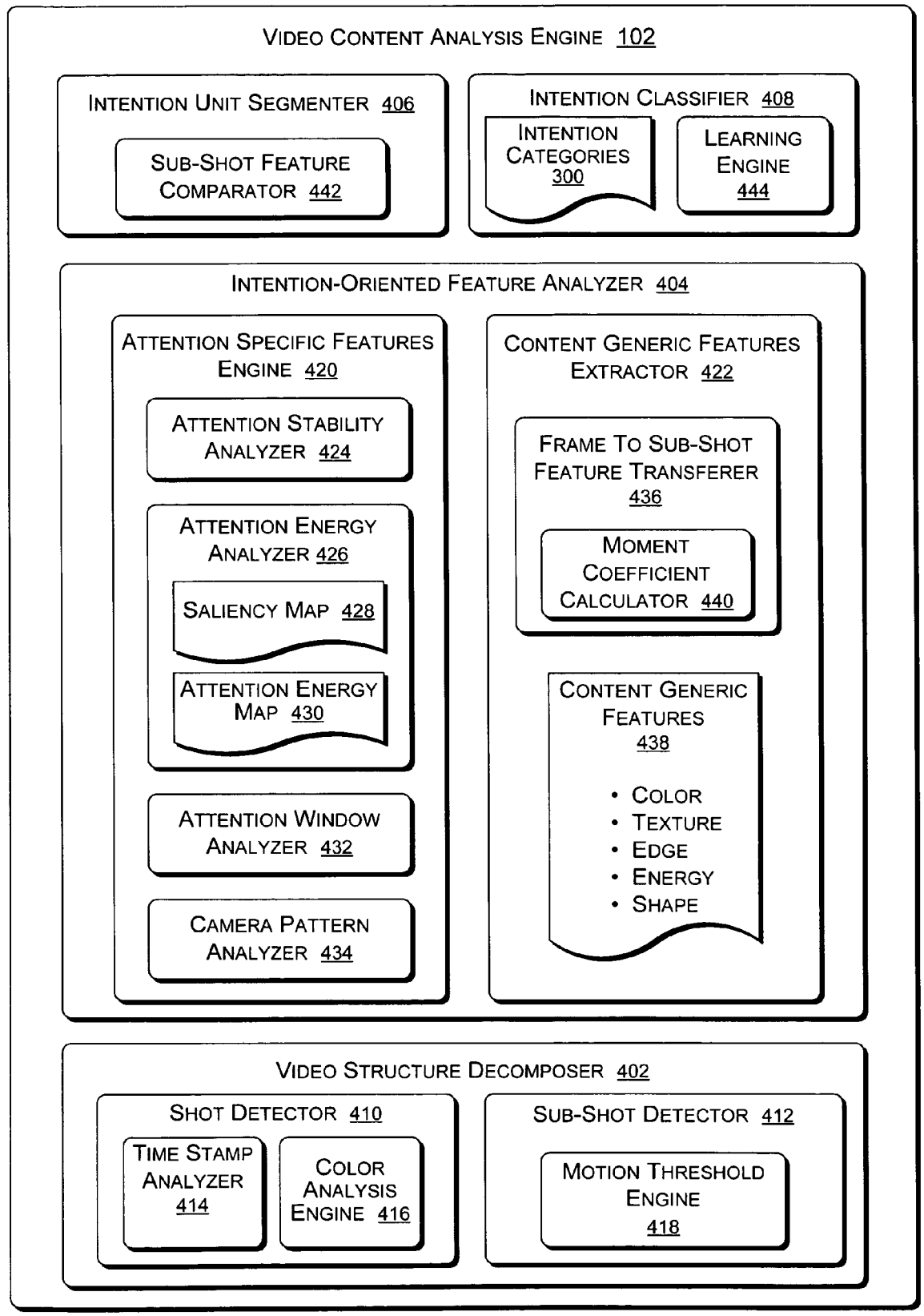
FIG. 4 is a block diagram of an exemplary video content analysis engine.

FIG. 4 shows the exemplary video content analysis engine 102 of FIGS. 1 and 2 in greater detail. The illustrated configuration of the exemplary video content analysis engine 102 is meant to provide only one example arrangement for the sake of overview. Many other arrangements of the illustrated components, or similar components, are possible within the scope of the subject matter. Such an exemplary video content analysis engine 102 can be executed in hardware, software, or combinations of hardware, software, firmware, etc.

The exemplary video content analysis engine 102 includes a video structure decomposer 402, an intention-oriented feature analyzer 404, an intention unit segmenter 406, and an intention classifier 408. In one implementation, the exemplary video content analysis engine 102 receives home videos as input and outputs an organized video database 104, that is, a collection of home videos organized according to capture-intention 202 categories and therefore, easily and logically accessible.

The video structure decomposer 402 may include both a shot detector 410 and a sub-shot detector 412. The shot detector 410 may further include a time stamp analyzer 414 and/or a color analysis engine 416, both used for delineating shots within a video scene. In one implementation, the sub-shot detector 412 further includes a motion threshold engine 418, since sub-shots can be delineated according to camera motions.

The intention-oriented feature analyzer 404 includes an attention-specific features engine 420 and a content generic features extractor 422. The attention-specific features engine 420 may include separate analyzers for video features that are relevant to the "attention" concept. In one implementation, as illustrated, the attention-specific features engine 420 includes analyzers for the four attention-specific features of: stability, energy, window, and camera pattern (to be described in more detail below). Accordingly, there is an attention stability analyzer 424; an attention energy analyzer 426, that may further include both a saliency map 428 and an attention energy map 430; an attention window analyzer 432; and a camera pattern analyzer 434.

The content generic features extractor 422 further includes a "frame to sub-shot feature transferer" 436. Since content generic features 438 are generally identified as features at the frame level, the feature transferee 436 converts the intention-relevancy of these features to the sub-shot level via a moment coefficient calculator 440. In other words, sub-shots are the operative unit for extracting intention units, as introduced above, while content generic features 438 are recognizable for their relevancy to intention at the frame level. Yet another way of saying this is that some content generic features 438 in a sub-shot can be made relevant to determining intention if they are considered at a higher frame level, since content generic features 438 are generally relevant to intention at the frame level. The content generic features 438 to be analyzed for determining intention can be predefined, thus the content generic features extractor 422 may store the content generic features 438 or, the content generic features 438 may be built into the fabric of the extractor 422.

The intention unit segmenter 406 may further include a sub-shot feature comparator 442. The intention classifier 408 may further include a database of intention categories 300 and a learning engine 444.

Upon receiving video content, such as one or more home video recordings, the video structure decomposer 402 dismantles the video composition into shots via the shot detector 410, and then each shot is divided into sub-shots via the sub-shot detector 412. As mentioned, in one implementation, sub-shots are the elementary structure unit for determining intention.

As introduced above, capture-intention 202 is related not only to attention 206, but also to content 204. Hence, the intention-oriented feature analyzer 404 excerpts two kinds of intention-oriented features from each sub-shot: the attention-specific features (also called Dimension of Attention, "DoA") and content generic features 438. The intention unit segmenter 406 and the learning-based intention classifier 408 perform their functions based on these features. The video content analysis engine 102 uses a learning-based approach based on the intention categories 300, which can be predefined. Moreover, for each intention category 300, the intention classifier 408 treats each classification independently as a two-class problem, thus other types of intention definitions can be integrated into such a framework. In other words, the intention classification performed by the exemplary video content analysis engine 102 is relatively generic and can be easily extended.

Video Structure Decomposition

As mentioned, in one implementation the basic intention unit lies between shot and sub-shot. A shot may contain complex motions (camera and object motions) and inconsistent content. Thus, neither key-frame based features, nor averaging based features (averaged over multiple frames or over all frames in a video recording) can preserve very well the rich content 204 and capture-intention 202 of the shot. As the elementary unit for video content analysis herein, a sub-shot contains comparatively coherent content and unitary semantics. Furthermore, capture-intention 202 may be reflected by the temporal relationship of a series of sub-shots. That is why sub-shot is selected as the elementary structure unit for feature analysis.

In one implementation, the time stamp analyzer 414 of the shot detector 410 first detects shot boundaries by the encoded time-stamp data, if present and if they can be obtained from raw videos. Alternatively, the color analysis engine 416 may use a color-based algorithm to discern shot boundaries. Then the sub-shot detector 412 decomposes each shot into sub-shots via the motion threshold engine 418. Instead of motion estimation directly from MVFs in an MPEG stream, the motion threshold engine 418 may use a robust algorithm for estimating an affine motion model, such as that in Konrad, J., and Dufaux, F., "Improved global motion estimation for N3," *ISO/IEC*, JTC1/SC29/WG11 M3096, February 1998, which is incorporated herein by reference.

Feature Analysis

Since attention 206 plays a key factor in the capture-intention 202 mechanism, attention 206 is regarded as a mid-level feature for intention tracking. As mentioned above, the intention-oriented feature analyzer 404 analyzes not only the attention 206 but also the home video content 204, which are both related to capture-intention 202. Hence, two kinds of intention oriented feature sets, i.e., attention-specific features and content generic features 438, are detected and analyzed for each sub-shot.

Attention-Specific Features

In contrast to conventional visual attention models, the definition of attention 206 herein is more comprehensive and substantial. The attention-specific features engine 420 uses attention 206 not in a conventional static image sense, but extends attention 206 to a temporal segment—a sub-shot. Furthermore, the attention-specific features engine 420 utilizes "Dimension of Attention" (DoA) to represent attention 206 in a sub-shot according to the study of attention principles in psychology (see, for example, Gerrig, R. J., and Zimbardo, P. G., *Psychology and Life* (16 Edition), Allyn & Bacon, July 2001). In contrast to conventional one-dimensional attention measures, in one implementation the attention-specific features engine 420 considers four aspects of attention (i.e., DoA)—energy, pattern, window, and stability, as previously mentioned.

Attention Energy

Attention energy is the ability or power to concentrate mentally. It is similar to the attention measure in Ma, Y. F., Lu, L., Zhang, H. J., and Li, M., "A User Attention Model for Video Summarization," *Proceedings of ACM Multimedia*, pp. 533-542, 2002, which is incorporated herein by reference. In a short period of time (e.g., a sub-shot), the camcorder user's attention energy is usually represented by contrast-based static salient objects; by temporal salient objects caused by foreground motion; and by camera operation derived from user's interest (see also, Ma, Y. F., and Zhang, H. J., "Contrast-based Image Attention Analysis by Using Fuzzy Growing," *Proceedings of ACM Multimedia*, 2003, which is incorporated herein by reference). The attention energy analyzer 426 takes these three aspects into account in order to estimate attention energy.

Figure 5:
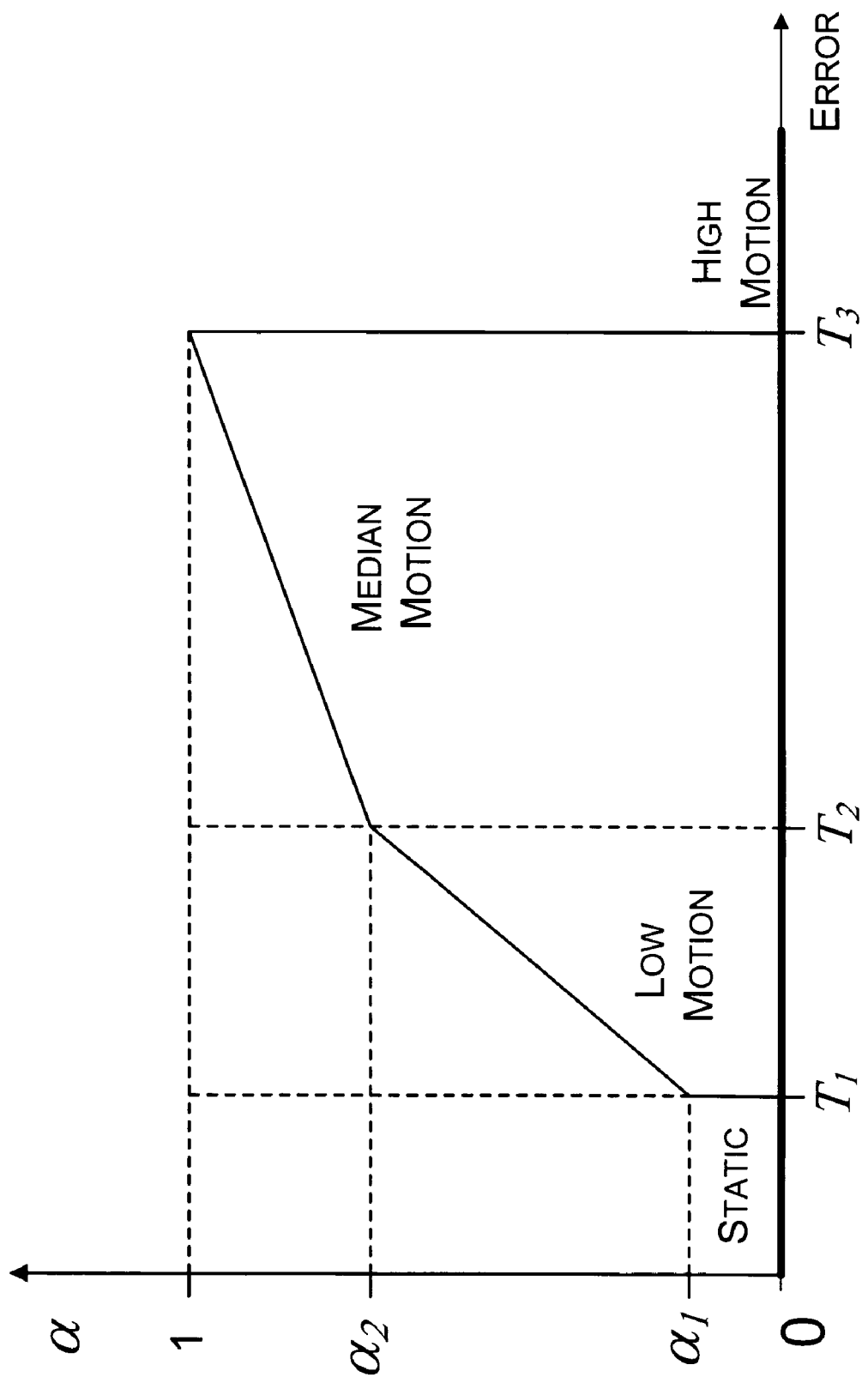
FIG. 5 is a diagram of generating saliency map detail during attention energy analysis.

The attention energy analyzer 426 first generates a saliency map M 428 by fusing static and temporal saliency maps at the frame level, as shown in Equation (1):

$$M = \alpha S_T + (1-\alpha) S_S + \beta S_T S_S \qquad (1)$$

where $S_S$ is the static saliency map, and $S_T = I \times C_T \times (1 - I \times C_S)$ is the temporal saliency map characterized by integrating the three motion inductors (I, $C_T$, $C_S$) described in the Ma et al., "A User Attention Model for Video Summarization" reference cited above. FIG. 5 shows computation of the $\alpha$ coefficient of Equation (1), which is deduced from the motion-level represented by frame difference with motion compensation (i.e., "Error" in FIG. 5). $\beta$ controls the strength of the complementary reinforcement. The three components (I, $C_T$, $C_S$) represent intensity inductor, temporal coherence inductor, and spatial coherence inductor, respectively, in a motion perception system.

Figure 6:
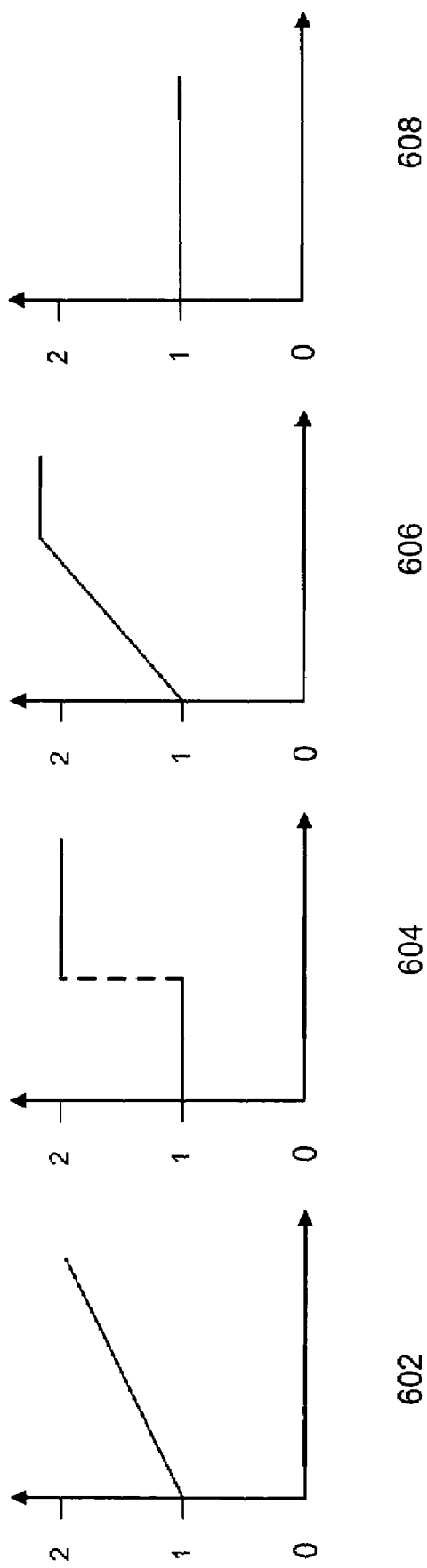
FIG. 6 is a diagram of an exemplary camera attention model.

Generally, different camera motions represent different degrees of the user's attention 206 and different degrees of transfer. Specifically, the zooming operation is regarded as indicating more attractiveness, in contrast to other operations, such as pan or tilt. Hence, the attention energy analyzer 426 models camera motion attention as the transformation of attention energy in a sub-shot. To obtain the attention energy map E 430 of a sub-shot, the attention energy analyzer 426 may adopt the camera attention model described in the Ma et al., "A User Attention Model for Video Summarization" reference cited above, simplified as shown FIG. 6. FIG. 6 represents a pure zoom 602, other motions followed by a zoom 604; a zoom followed by other motions 606; and just other motions 608. The attention energy analyzer 426 linearly combines all of the saliency map M 428 with the weight of camera attention factor C, to define the attention energy map E 430 of a sub-shot, as shown in Equation (2):

$$E(i, j) = \sum_{n=1}^{N} M_n(i, j) \cdot C_n \qquad (2)$$

where E(i,j) is the energy value at pixel (i,j), and N is the number of frames in a sub-shot.

Figure 7:
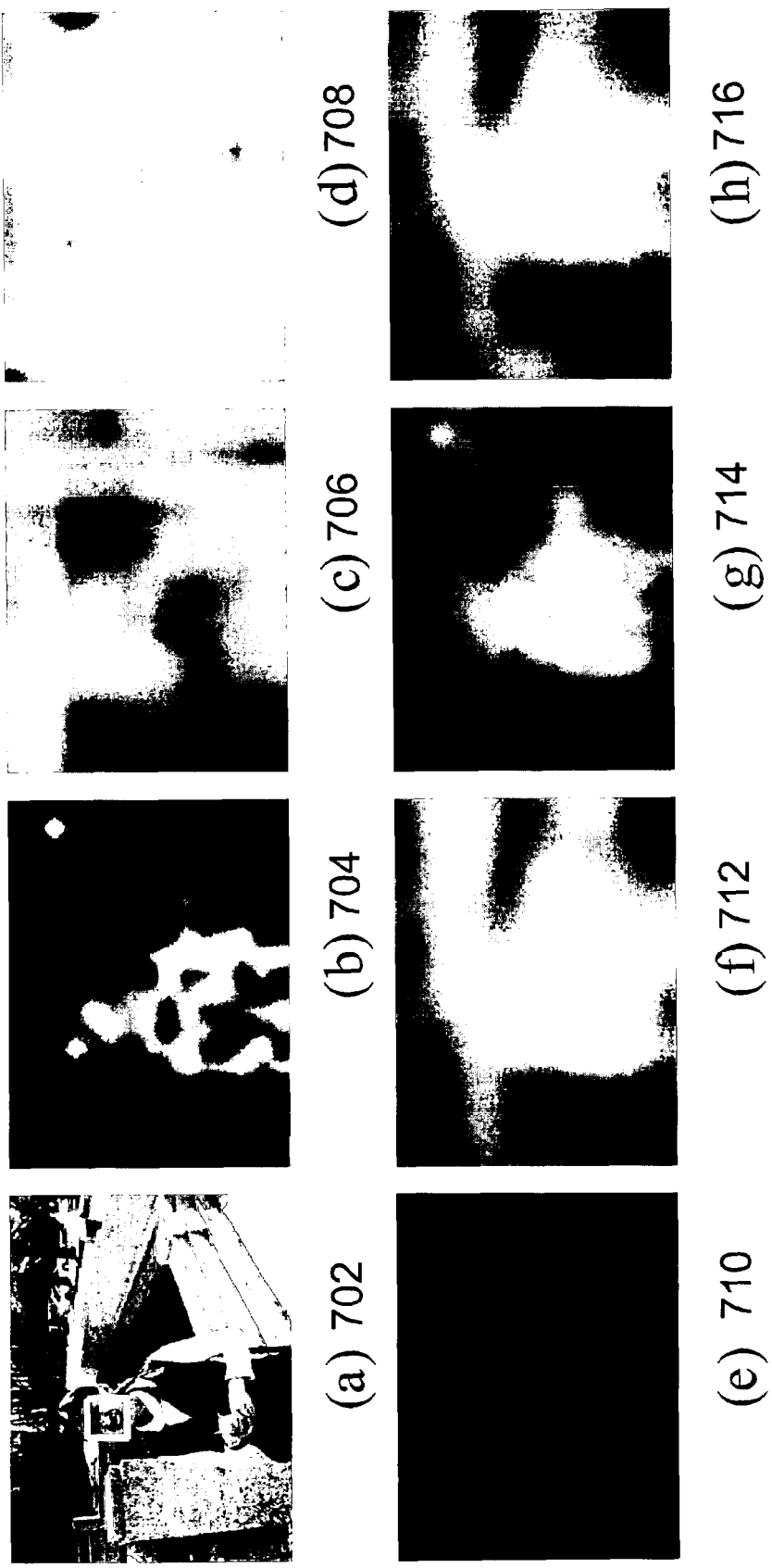
FIG. 7 is a diagram of exemplary attention energy map generation.

FIG. 7 shows an example generation of the attention energy map 430, that is, attention energy detection in a sub-shot. Frame (a) 702 shows the original frame including a face detection rectangle; frame (b) 704 shows I, the motion intensity map; frame (c) 706 shows $C_S$, the spatial energy map; frame (d) 708 shows $C_T$, the temporal energy map; frame (e) 710 shows $S_T$, the temporal saliency map; frame (f) 712 shows $S_S$, the static saliency map; frame (g) 714 shows M, the attention map of a single frame; and frame (h) 716 shows E, the attention energy map 430 of the entire sub-shot.

Finally, attention energy is computed as the average energy of the E map 430 after median filtering and morphological operation.

Attention Pattern

"Attention pattern" reflects the transfer process of the user's focus of attention. The temporal camera pattern, which is analyzed by the camera pattern analyzer 434, can be regarded as attention pattern. For example, when a user is attracted by scenery, he usually uses a slow panning operation to capture this beautiful scenery (i.e., the intention category called "BS"). This implies that the user's attention pattern can be represented by his camera pan operation.

Figure 8:
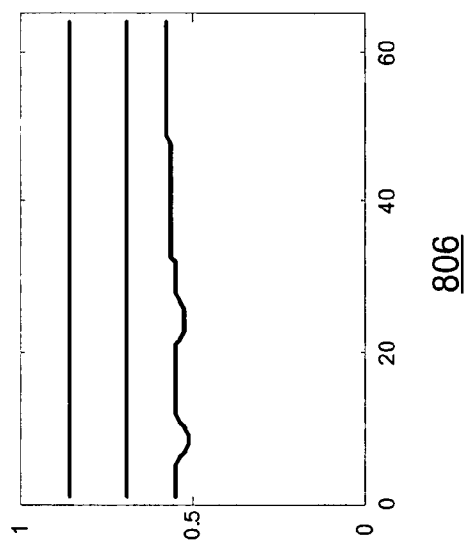
FIG. 8 is a diagram of exemplary camera pattern analysis.
Figure 8:
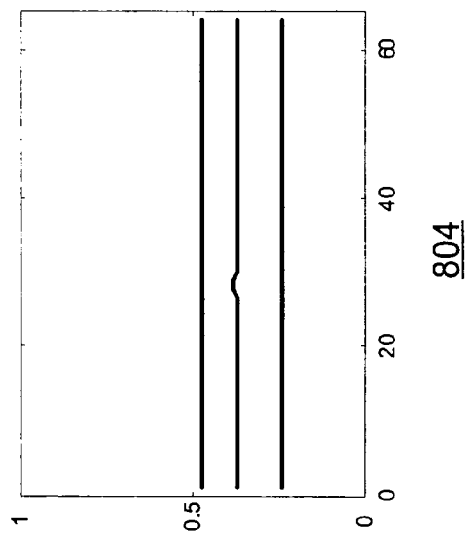
Figure 8:
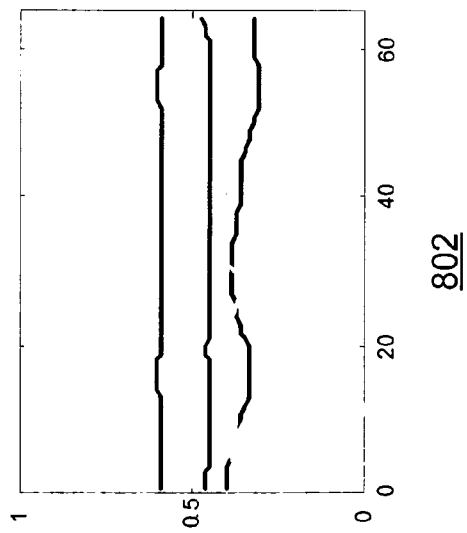

To explicitly represent the temporal camera patterns, the camera pattern analyzer 434 adopts a wavelet-based approach, which is conventionally applied to audio energy envelope pattern mining, as in Cai, R., Lu, L., Zhang, H. J., and Cai, L. H., "Improve Audio Representation by Using Feature Structure Patterns," *Proceedings of ICASSP*, Vol. 4, pp. 345-348, 2004, which is incorporated by reference herein. The camera pattern analyzer 434 considers each pan, tilt, and zoom as three independent components of camera motion, and each component is clustered as four representative patterns, as shown in FIG. 8. In FIG. 8, the three representative temporal camera patterns are clustered in each graph: a pan motion 802; a tilt motion 804; and a zoom motion 806. Similar to the Cai reference just cited above, the attention pattern of a sub-shot is characterized as a 12-dimension vector $\vec{AP}$ ("12D," where 12=3 components×4 patterns), which consists of distance between current motion components (P, T, Z) and each representative pattern ($P_i^*$, $T_i^*$, $Z_i^*$), as shown in Equation (3):

$$\vec{AP} = [D_w(P,P_i^*), D_w(T,T_i^*), D_w(Z,Z_i^*)], \quad (3)$$

where $D_w$ is the $L_2$ distance in wavelet coefficient space, and i (i=1, 2, 3, 4) denotes the cluster of each motion component.

Attention Window and Stability

The attention window analyzer 432 analyzes the "attention window," which denotes the perceived "size" of an area of attention; while the attention stability analyzer 424 analyzes "attention stability," which denotes the degree or duration of persistence of this area. In one implementation, attention window is measured by the size/area of the attended area in the E map 430, while attention stability is measured by sub-shot duration, respectively.

Content Generic Features

The content generic features extractor 422 extracts content generic features 438 to help strengthen the relationship between capture-intention 202 and the low-level features (that reflect capture-intention 202). A set of content generic features 438, which have proven effective for content-based image/video analysis are applied, and are listed in Table (2):

TABLE 2

| Content generic features | | |
| --- | --- | --- |
| Type | Features | Dim. |
| Color | Color Moment | 9 |
| | Color Histogram [26] | 64 |
| | Dominant Color [32] | 64 |
| | HSV Coherence [30] | 128 |
| | Brightness | 1 |
| | Image Quality | 1 |
| Texture | Tamura [29] | 20 |
| | MSAR [28] | 15 |
| Energy | DCT Moment | 6 |
| | Motion Activity [26] | 4 |
| | Face Area [31] | 1 |
| | Static Attention [12] | 1 |
| Shape & Edge | Image Orientation [23] | 2 |
| | Edge Distribution | 15 |
| | City/Landscape [23] | 2 |
| | Indoor/Outdoor [23] | 2 |

These content generic features 438 are used to represent image content according to four different types: color, texture, energy, shape and edge (335 dimensions in total). To transfer these frame level content features to sub-shot features, the moment coefficient calculator 440 computes one- and two-order moment coefficients along the frames in the sub-shot. Consequently, there are 670D content generic features 438 extracted for each sub-shot.

In one implementation, the semantic gap between these content generic features 438 and the capture-intention 202 is treated in the manner of "black box" model. The content generic features extractor 422 may use two feature re-extraction schemes to find the most dominant and useful features (i.e., PCA and Boosting based schemes. See, Tong, H. H., Li, M., Zhang, H. J., He, J. R., and Zhang, C. S., "Classification of Digital Photos Taken by Photographers or Home Users," *Proceedings of PCM*, pp. 198-205, 2004).

Intention Unit Segmentation

In one implementation, after processing by the intention-oriented feature analyzer 404, each sub-shot is represented by 685D features (15D attention-specific features and 670D content generic features). An intention unit, however, is at a higher level than a sub-shot, i.e., an intention unit may consist of several sub-shots. Thus, the intention unit segmenter 406 performs segmentation at the sub-shot level. The sub-shot feature comparator 442 treats the task of segmenting into segmentation units in a manner that is similar to shot boundary detection and event detection in video sequence processing. That is, a large difference between pair-wise sub-shot features indicates the boundary of an intention unit. But, direct use of the 685D features for intention segmentation is typically both unreliable and computationally expensive, so the intention unit segmenter 406 adopts a Singular Value Decomposition (SVD)-based segmentation approach, for example, as described in Rui, Y, and Anandan, P., "Segmenting Visual Actions Based on Spatio-Temporal Motion Patterns," *Proceedings of CVPR*, pp. 11-118, 2000. Thus, in one implementation, the intention unit segmenter 406 applies an intention unit segmentation algorithm as set forth below:

Definitions:

F: feature set of a video

M: feature dimension

N: the number of sub-shot in a video

T: distance threshold for detecting intention unit boundary

Algorithm:

1. Normalize each dimension of $n_{th}$ sub-shot feature set $F_n$ to [0, 1]
2. Concatenate $F_n$ from N sub-shots into an M×N matrix A
3. Decompose A by SVD as $A=U \times W \times V^T$, where U is a (M×N) left orthogonal matrix representing the principle component directions; $W=\text{diag}(w_1, \ldots, w_N)$ is a (N×N) diagonal matrix with single values in descending order; V is a (N×N) right orthogonal matrix that expands A in terms of U
4. Compute the Euclidean distance between two successive sub-shot feature set $F_n$ and $F_{n+1}$ by $D_n = \Sigma_l w_l (v_{n,l} - v_{n+1,l})^2$, l=1, ..., L, where $w_l$ is the $l_{th}$ single value, models each SVD coefficient's weight to the overall distance, L (L<N) is the number of principle component
5. Detect intention unit boundary:

if n is a shot boundary, then n is also an intention boundary otherwise: if $D_n>T$, an intention boundary exists; otherwise no intention boundary exists.

Figure 9:
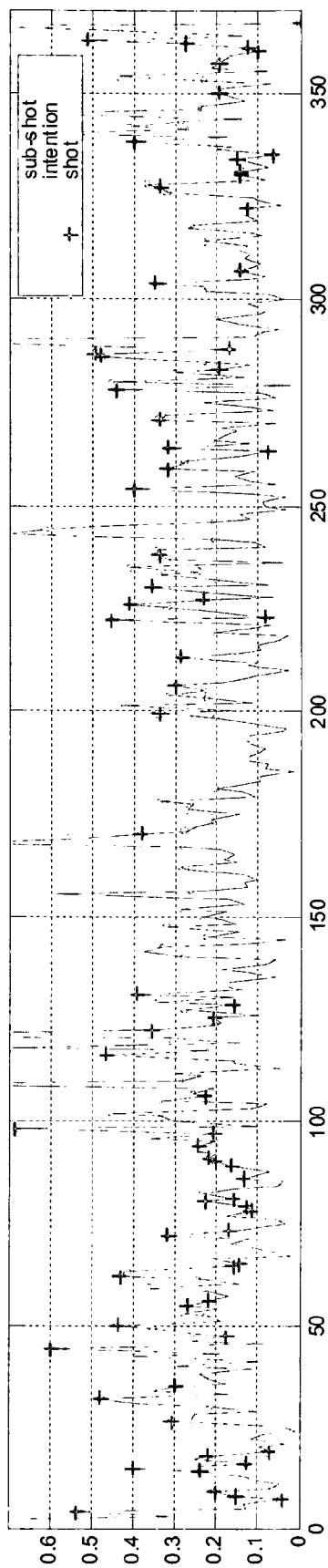
FIG. 9 is a diagram of exemplary delineation of a home video into shots, sub-shots, and intention units.

FIG. 9 shows an example of Euclidean distance between successive sub-shots of a home video, where the number of shots, the number of sub-shots, and the number of intention units are 83, 367, and 191, respectively. In one implementation, the delineation into intention units is threshold-based. But many adaptive threshold selection techniques can be utilized in the delineation.

Intention Classification

Because capture-intention 202 corresponds to high-level semantic concept in video content analysis, as discussed above, the intention classifier 408 includes a learning engine 444—so that in one implementation the classification is performed in a manner analogous to semantic modeling in many existing video retrieval systems. Because an intention unit may consist of one or more sub-shots after intention unit segmentation, the intention classifier 408 does not adopt temporal classifiers such as HMM (Hidden Markov Model) for intention classification. Instead, the intention classifier 408 uses one of two classification schemata based on two static discriminative classifiers: either a Support Vector Machine (SVM) approach or a Boosting approach. But first, the intention classifier 408 averages the sub-shot based features of all sub-shots within an intention unit as intention features of the corresponding intention unit.

Support Vector Machine (SVM) Schema

The SVM approach has been approved with theoretical justification to provide good generalization ability, as described in Vapnik, V., *The Nature of Statistical Learning Theory*, Springer-Verlag, N.Y., 1995. Given a training set $S=\{(x_i,y_i)|i=1,\ldots,l\}$ of size l, where $x_i=R^n, y_i=\{+1,-1\}$, and a kernel function $K(x_i, y_i) \equiv \phi(x_i)^T \phi(x_i)$, the intention classifier 408 using the SVM approach solves the following quadratic programming task with linear constraints, as shown in Equation (4):

$$\min_{w,b,\xi} \frac{1}{2} w^T \cdot w + C \sum_{i=1}^{l} \xi_i \quad (4)$$

subject to: $y_i(w^T \varphi(x_i) + b) + \xi_i \geq 1$, $\xi_i \geq 0$, $i = 1, 2, \ldots, l$ The class prediction function is then formulated as $f(x)=\text{sign}\{H(x)\}$, where $H(x)=\Sigma_i \alpha_i y_i K(x_i,x)+b$ can be deemed as the measurement of similarity between a given pattern and the query.

However, the intention classifier 408 cannot directly apply SVM classification due to the large dimension size of initial features (i.e., 685D). To use the SVM approach, the intention classifier 408 selects a subset from the initial set of content generic features by principle component analysis (PCA). Then, the attention-specific features together with the re-extracted content generic features are applied to SVM for training. Since SVM techniques only output class labels, the sigmoid equation is used to generate a probability as shown in Equation (5):

$$P(y = +1 \mid x) = \frac{1}{1 + e^{-2H(x)}} \quad (5)$$

In one implementation, an intention unit may belong to more than one of the intention categories 300. For example, an intention unit of seascape may be regarded as being in both of the intention categories 300 referred to as beautiful scenery (BS) and static scene (SS). Thus, in one implementation, seven SVM classifiers, i.e., the SS, DE, CV, BS, SR, LR, and JR intention categories 300 are trained via the learning engine 444 based on a one-against-all scheme. If all the outputs of the seven classifiers are −1.0, the current intention unit is classified into the "default" category of "just recording" (JR). The probability of classification into JR is estimated by Equation (6):

$$P(JR=+1|x)=1-\max\{P(i=+1|x)\} \quad (6)$$

where i=SS, DE, CV, BS, SR, and LR. Consequently, each intention unit is assigned seven intention probability values that indicate the likelihood of being classified into each of the seven respective intention categories 300.

Boosting-based Schema

Alternatively, the intention classifier 408 may use the boosting-based schema. Boosting is a general learning technique that attempts to "boost" the accuracy of any given learning algorithm by combing weak learners. In contrast to the SVM-based schema described above, which performs feature selection at the outset, the boosting procedure can be considered a feature selection process. Thus, using a boosting-based schema, the intention classifier 408 applies the initial feature set to the known Real AdaBoost algorithm for both feature selection and classifier training. Similarly, Equation (5) is used to generate a probability P(x) from the output of Real AdaBoost H(x).

Exemplary Methods

Figure 10:
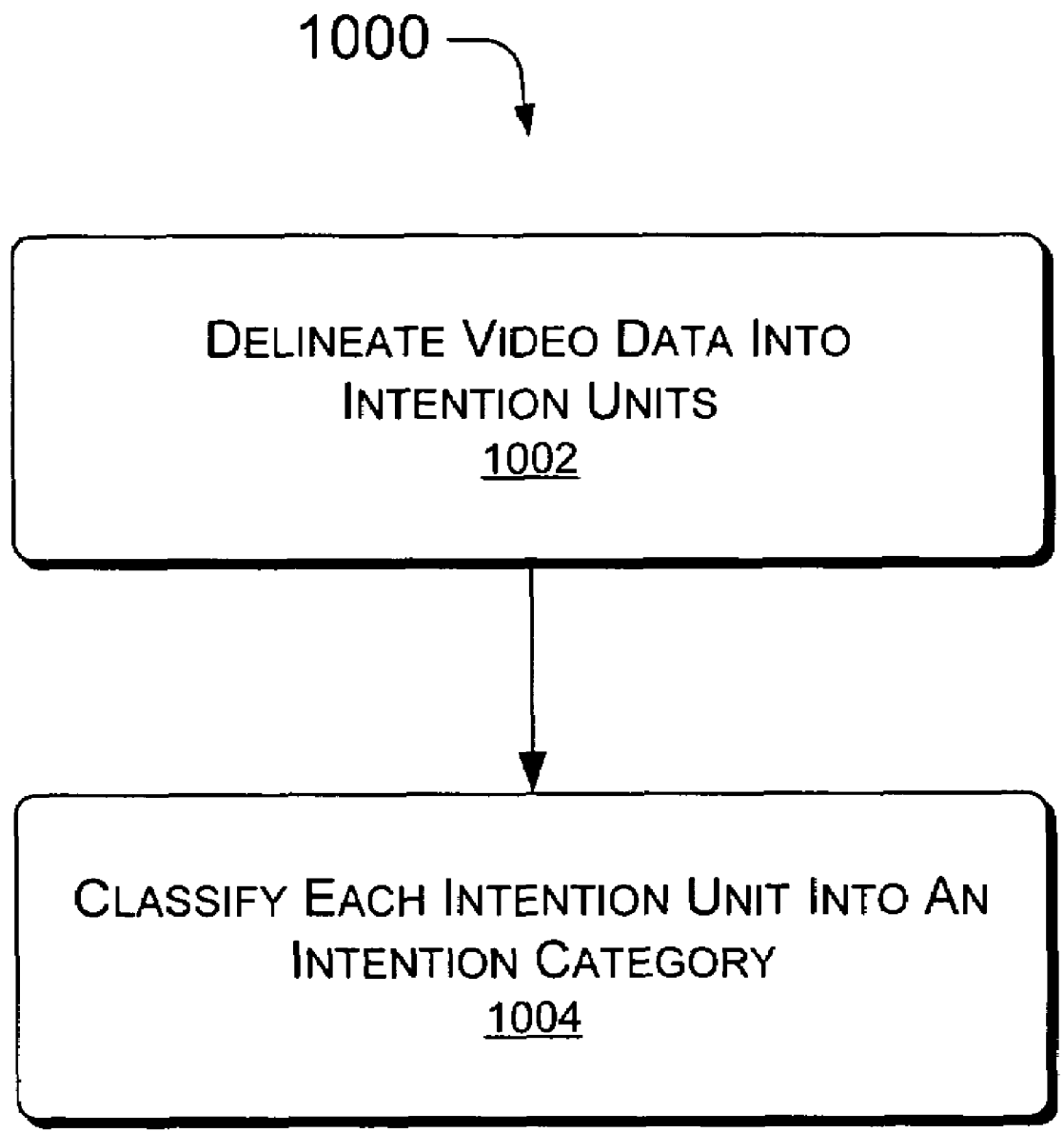
FIG. 10 is a flow diagram of an exemplary method of detecting capture-intention to analyze video content.

FIG. 10 shows an exemplary method 1000 of detecting capture-intention for video content analysis. In the flow diagram, the operations are summarized in individual blocks. Parts of the exemplary method 1000 may be performed by hardware, software, firmware, etc., or combinations thereof, for example, by components of the exemplary video content analysis engine 1000.

At block 1002, video data is delineated into intention units. In one implementation, the delineation follows upon a division of the video data into scenes, shots, and sub-shots. Shots may be determined according to timestamp or by color analysis, while sub-shots may be determined by individual camera motion operations within a shot. Thus, a zooming-in operation might constitute one sub-shot. Attention-specific features and content generic features are mined from the sub-shots. Attention is a characteristic of the psychological intention mechanism, and thus is indicative of human intention.

At block 1004, intention units from the delineating at block 1002 are each classified into one or more intention categories. In one implementation, the classification of intention units into intention categories is based on the same features extracted from sub-shots at block 1004. Thus, intention-oriented features extracted from sub-shots are used both to determine that a certain number of sub-shots share a common capture-intention—i.e., they constitute an intention unit—and also to classify the resulting intention unit according to the intention that the sub-shots share.

Figure 11:
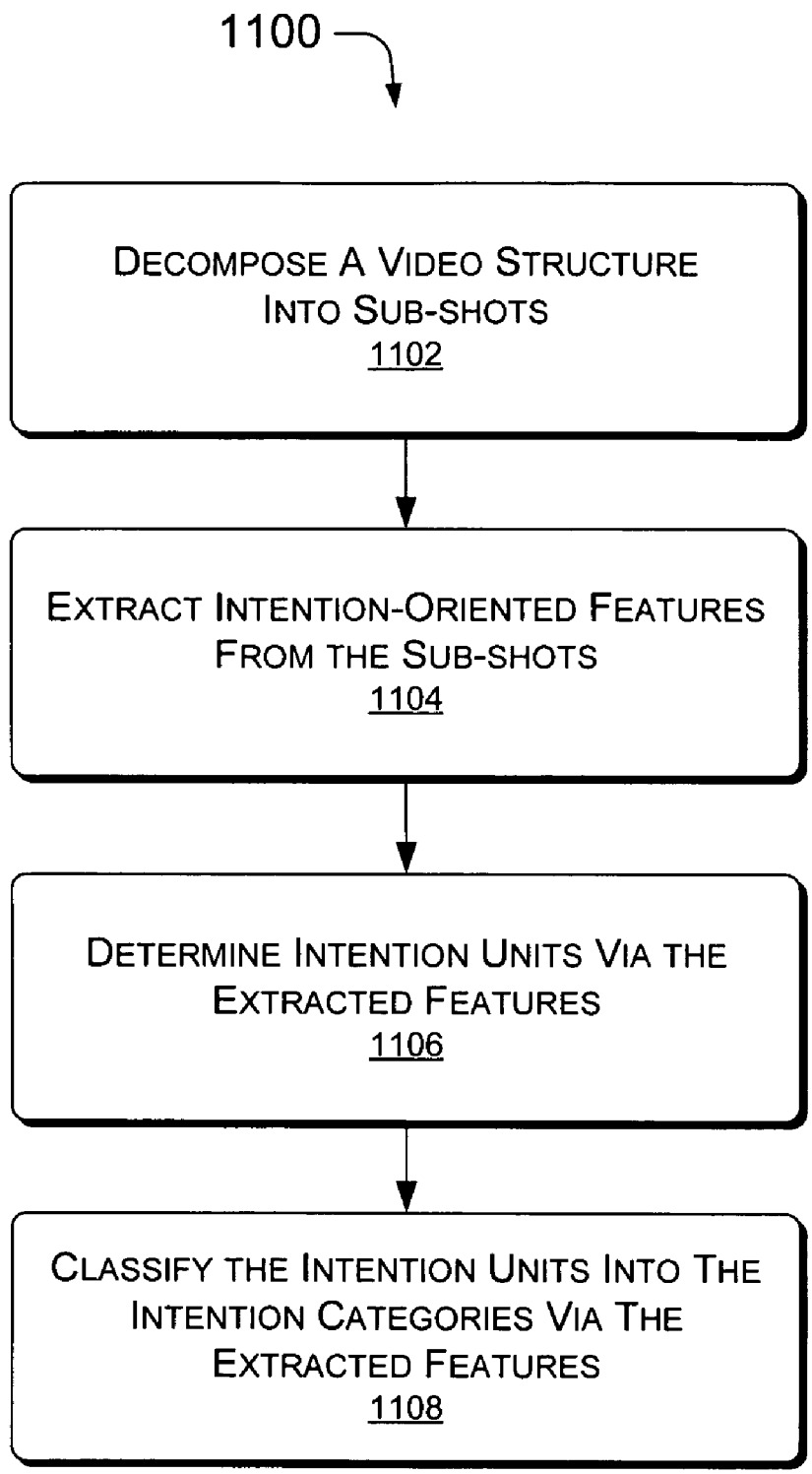
FIG. 11 is a flow diagram of another exemplary method of detecting capture-intention to analyze video content.

FIG. 11 shows another exemplary method 1100 of detecting capture-intention for video content analysis. In the flow diagram, the operations are summarized in individual blocks. Parts of the exemplary method 1000 may be performed by hardware, software, firmware, etc., or combinations thereof, for example, by components of the exemplary video content analysis engine 102.

At block 1102, a video structure of a video recording is decomposed into sub-shots. Sub-shots are defined by various camera motions, and their boundaries within a video can be decided according to selected thresholds. Sub-shot determination can be made by an exemplary video structure decomposer 402.

At block 1104, features that are relevant to capture-intention are extracted from the sub-shots, e.g., by an intention-oriented feature analyzer 404. Attention-specific features indicate a human intention at play in creating a recorded video. Such features include attention window—the area of focus in a sub-shot; attention stability—the duration of a given attention window; attention energy—the saliency of given features to human intention; and camera pattern—the relevancy of camera motion behavior in indicating capture-intention.

At block 1106, intention units are determined using the extracted features from the sub-shots. An intention unit is simply one or more contiguous sub-shots that share one or more common capture-intention themes. The intention units may be delineated by an intention unit segmenter 406.

At block 1108, the intention units are classified into intention categories via the extracted features. This classification may be executed by an exemplary learning-based intention classifier 408. Learning-based intention classification may be implemented with Support Vector Machine (SVM) or Boosting classification schemata. The intention categories may be defined ahead of time, and can be based on psychological study of the human intentions underlying photography and camcorder use. Once defined, an objective link is established (e.g., by the exemplary method 1100 or by an exemplary video content analysis engine 102) that relates each intention category to the extracted features of sub-shots.

Conclusion

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary capture-intention detection for video content analysis. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
on a video content analysis device:
delineating video data into intention units;
extracting features from the video data, wherein each feature is used to estimate one or more human intentions wherein the extracting features includes extracting attention-specific features, and wherein each attention-specific feature represents one dimension of human attention, and wherein the extracting attention-specific features includes analyzing four dimensions of attention (DoA): an attention stability, an attention energy, an attention window, and a camera pattern;
classifying the intention units into intention categories; and
selecting a number of categories to be the intention categories and defining each of the intention categories according to a type of video content characteristic of one of the human intentions, wherein the intention categories include a static scene category, a dynamic event category, a close-un view category, a beautiful scenery category, a switch record category, a longtime record category, and a just record category.

2. The computer-implemented method as recited in claim 1, wherein each of the intention categories represents one of multiple human intentions for capturing images with a camera to create the video data.

3. The computer-implemented method as recited in claim 1, wherein the delineating video data into intention units further includes decomposing a video structure into sub-shots based on camera motion thresholds.

4. The computer-implemented method as recited in claim 1, wherein the extracting features includes extracting content generic features, wherein each content generic feature comprises a low-level visual feature that reflects a capture intention by strengthening a relationship between the capture-intention and low-level features.

5. The computer-implemented method as recited in claim 1, wherein each different human intention corresponding to one of the intention categories is capable of being indicated in the video content by intention-oriented features.

6. The computer-implemented method as recited in claim 1, wherein the delineating video data into intention units includes dividing the video data into temporal sub-shots, wherein each sub-shot comprises a camera motion, and each intention unit comprises one or more sub-shots assignable to the same one or more intention categories.

7. The computer-implemented method as recited in claim 6, wherein the delineating the video data into the intention units includes comparing both attention-specific features and content generic features of the contiguous sub-shots, this comparing performed to determine the number of sub-shots to be included in a given intention unit.

8. The computer-implemented method as recited in claim 7, further comprising classifying each intention unit as belonging to one or more of the intention categories based on the attention-specific features and the content generic features.

9. The computer-implemented method as recited in claim 1, wherein the classifying each intention unit to one or more intention categories includes a learning-based classification of the intention units.

10. The computer-implemented method as recited in claim 9, wherein the learning-based classification includes applying one of a support vector machine (SVM) classification schema or a Boosting classification schema.

11. The computer-implemented method as recited in claim 1, further comprising organizing a video recording or multiple video recordings in a video library according to the classification of the intention units into the intention categories.

12. A system, comprising:
a processing device to enable operation of one or more system components;
a shot detector to determine temporal segments of video shots in video data;
a sub-shot detector to determine temporal segments of sub-shots in the video shots;

a feature analyzer to determine both attention-specific characteristics and content-generic characteristics for each of multiple features of each sub-shot, wherein the attention characteristic indicates a person's attention degree on the scene or object to be captured or having been captured wherein the multiple features of a sub-shot include attention-specific features, the attention-specific features including:

an attention stability, an attention energy, an attention window, and a camera pattern;

an intention unit segmenter to delineate intention units composed of the sub-shots according to the attention characteristics of the features of the sub-shots; and an intention classifier to assign each intention unit to an intention category, such that the video data is capable of being organized by intention units, wherein the intention categories include a static scene category, a dynamic event category, a close-up view category, a beautiful scenery category, a switch record category, a longtime record category, and a just record category.

13. The system as recited in claim 12, wherein the multiple features of a sub-shot further includes content generic features.

14. The system as recited in claim 12, wherein the intention classifier includes a learning engine to train the classification of intention units into intention categories by applying one of a support vector machine (SVM) classification schema or a Boosting classification schema.

15. A system, comprising:

a processing device to enable operation of one or more system components;

means for delineating video data into intention units;

means for extracting features from the video data, wherein each feature is used to estimate one or more of the human intentions wherein the extracting features includes extracting attention-specific features, and wherein each attention-specific feature represents one dimension of human attention, and wherein the extracting attention-specific features includes analyzing four dimensions of attention (DoA): an attention stability, an attention energy, an attention window, and a camera pattern; and means for classifying the intention units into intention categories, wherein the intention categories include a static scene category, a dynamic event category, a close-up view category, a beautiful scenery category, a switch record category, a longtime record category, and a just record category.

* * * * *